(12) United States Patent
Foottit et al.

(10) Patent No.: US 9,807,191 B1
(45) Date of Patent: Oct. 31, 2017

(54) SYSTEM, METHOD, AND COMPUTER PROGRAM FOR CACHING POLICY REQUEST DECISIONS IN A CONSUMER TELECOMMUNICATIONS NETWORK

(71) Applicant: Amdocs Software Systems Limited, Dublin (IE)

(72) Inventors: Thomas Alexander Foottit, Stittsville (CA); Yong Li, Kanata (CA)

(73) Assignees: Amdocs Development Limited, Limassol (CY); Amdocs Software Systems Limited, Dublin (IE)

( * ) Notice: Subject to any disclaimer, the term of this patent is extended or adjusted under 35 U.S.C. 154(b) by 211 days.

(21) Appl. No.: 14/207,238

(22) Filed: Mar. 12, 2014

Related U.S. Application Data

(60) Provisional application No. 61/807,796, filed on Apr. 3, 2013.

(51) Int. Cl.
*G06F 15/167* (2006.01)
*H04L 29/08* (2006.01)

(52) U.S. Cl.
CPC .............................. *H04L 67/2852* (2013.01)

(58) Field of Classification Search
CPC ................................................. H04L 67/2842
(Continued)

(56) References Cited

U.S. PATENT DOCUMENTS

RE39,135 E 6/2006 Riddle
8,688,825 B1 4/2014 Shani
(Continued)

OTHER PUBLICATIONS

Non-Final Office Action from U.S. Appl. No. 14/207,211, dated Mar. 9, 2016.
(Continued)

*Primary Examiner* — Joseph Greene
(74) *Attorney, Agent, or Firm* — Zilka-Kotab, PC

(57) ABSTRACT

A system, method, and computer program product are provided for caching policy request decisions in a consumer telecommunications network. In use, a cache for storing a plurality of policy decisions is maintained, each of the plurality of policy decisions having at least one first policy decision criteria value associated therewith. Additionally, at least one policy request associated with at least one subscriber of a network is received from a requesting system, the at least one policy request having at least one second policy decision criteria value associated therewith. Further, it is determined whether the at least one second policy decision criteria value associated with the at least one policy request is stored in the cache. Responsive to determining that the at least one second policy decision criteria value associated with the at least one policy request is stored in the cache, a first policy decision associated with the at least one second policy decision criteria is retrieved from the cache, and the first policy decision is provided to the requesting system. Responsive to the determining that the at least one second policy decision criteria value associated with the at least one policy request is not stored in the cache, a new second policy decision corresponding to the at least one second policy decision criteria value is calculated, the new second policy decision is provided to the requesting system, and the new second policy decision corresponding to the at least one second policy decision criteria value is stored in the cache.

6 Claims, 5 Drawing Sheets

(58) Field of Classification Search
USPC .......................................................... 709/213
See application file for complete search history.

(56) References Cited

U.S. PATENT DOCUMENTS

| | | | |
|---|---|---|---|
| 2003/0236781 A1* | 12/2003 | Lei | G06F 17/30471 |
| 2005/0176465 A1* | 8/2005 | Fornell | H04W 8/183 |
| | | | 455/558 |
| 2008/0104661 A1* | 5/2008 | Levin | G06F 21/6218 |
| | | | 726/1 |
| 2009/0276386 A1 | 11/2009 | Greening et al. | |
| 2011/0055395 A1 | 3/2011 | Wang et al. | |
| 2011/0149737 A1 | 6/2011 | Muthiah et al. | |
| 2012/0117235 A1 | 5/2012 | Castro Castro et al. | |
| 2012/0173759 A1* | 7/2012 | Agarwal | H04L 67/2814 |
| | | | 709/241 |
| 2014/0047181 A1* | 2/2014 | Peterson | G06F 12/0873 |
| | | | 711/118 |
| 2014/0315536 A1* | 10/2014 | Chow | H04W 8/18 |
| | | | 455/419 |
| 2014/0378094 A1 | 12/2014 | Gillick et al. | |
| 2015/0105045 A1 | 4/2015 | Rolfe et al. | |
| 2015/0249621 A1 | 9/2015 | Tian et al. | |

OTHER PUBLICATIONS

Non-Final Office Action from U.S. Appl. No. 14/207,211, dated Sep. 8, 2016.
Advisory Action from U.S. Appl. No. 14/207,211, dated Dec. 30, 2016.

* cited by examiner

SYSTEM, METHOD, AND COMPUTER PROGRAM FOR CACHING POLICY REQUEST DECISIONS IN A CONSUMER TELECOMMUNICATIONS NETWORK

CLAIM OF PRIORITY AND RELATED APPLICATIONS

This application claims the benefit of U.S. Provisional Application No. 61/807,796, filed Apr. 3, 2013, the entire contents of which are incorporated herein by reference. This application is related to U.S. Provisional Application No. 61/807,793, filed Apr. 3, 2013, and U.S. patent application Ser. No. 14/207,211, filed Mar. 12, 2014, now U.S. Pat. No. 9,762,504, the entire contents of which are incorporated herein by reference.

FIELD OF THE INVENTION

The present invention relates to telecommunications networks, and more particularly to customer policies associated with such networks.

BACKGROUND

Often times, in telecommunications networks, policy decisions are similar for multiple users of such networks. For example, multiple users may have similar user profiles and/or be associated with a similar location. Furthermore, such similar users may be associated with similar subscription plans and/or utilize similar devices.

In both mobile and fixed telecommunication networks, criteria used for making policy decisions, and hence the policy decision itself, will typically not change frequently. Therefore, when a subscriber detaches from the network and then re-attaches to the network, the criteria for the policy will, in many cases, remain unchanged, and hence the policy will not have changed. Regenerating policy decisions for such subscriber every time the subscriber reconnects to the network, as typical policy control systems function, creates an unnecessary burden on the system. There is thus a need for addressing these and/or other issues associated with the prior art.

SUMMARY

A system, method, and computer program product are provided for caching policy request decisions in a consumer telecommunications network. In use, a cache for storing a plurality of policy decisions is maintained, each of the plurality of policy decisions having at least one first policy decision criteria value associated therewith. Additionally, at least one policy request associated with at least one subscriber of a network is received from a requesting system, the at least one policy request having at least one second policy decision criteria value associated therewith. Further, it is determined whether the at least one second policy decision criteria value associated with the at least one policy request is stored in the cache. Responsive to determining that the at least one second policy decision criteria value associated with the at least one policy request is stored in the cache, a first policy decision associated with the at least one second policy decision criteria is retrieved from the cache, and the first policy decision is provided to the requesting system. Responsive to the determining that the at least one second policy decision criteria value associated with the at least one policy request is not stored in the cache, a new second policy decision corresponding to the at least one second policy decision criteria value is calculated, the new second policy decision is provided to the requesting system, and the new second policy decision corresponding to the at least one second policy decision criteria value is stored in the cache.

DETAILED DESCRIPTION

Figure 1:
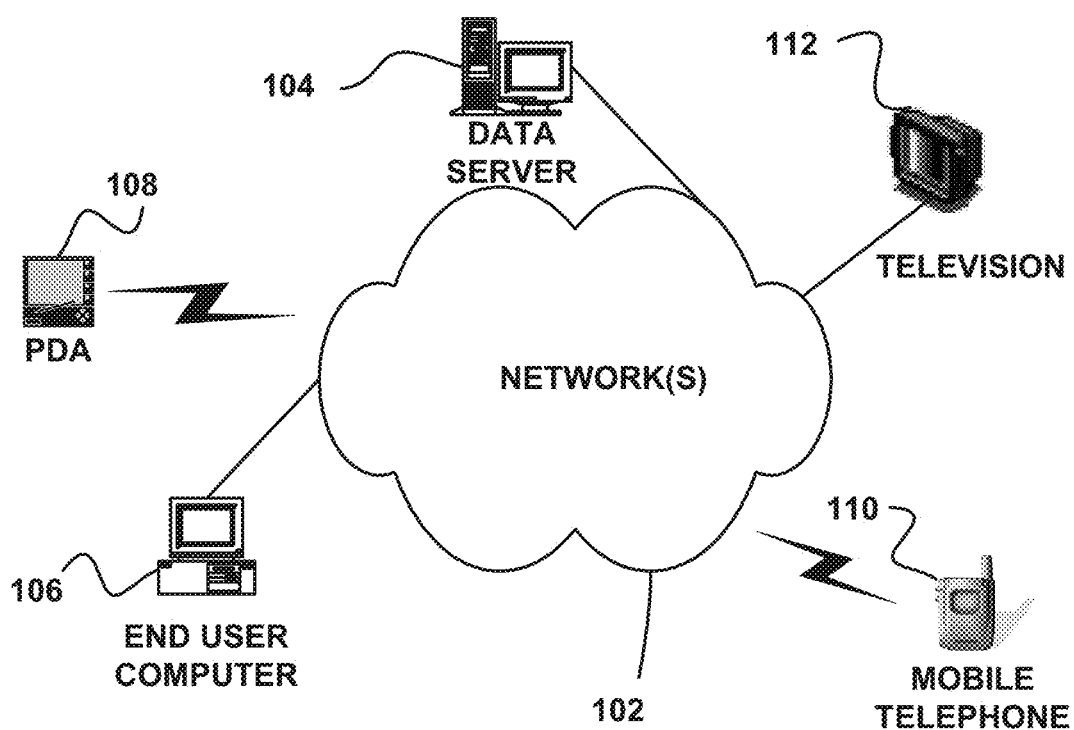
FIG. 1 illustrates a network architecture, in accordance with one possible embodiment.
Figure 1:

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
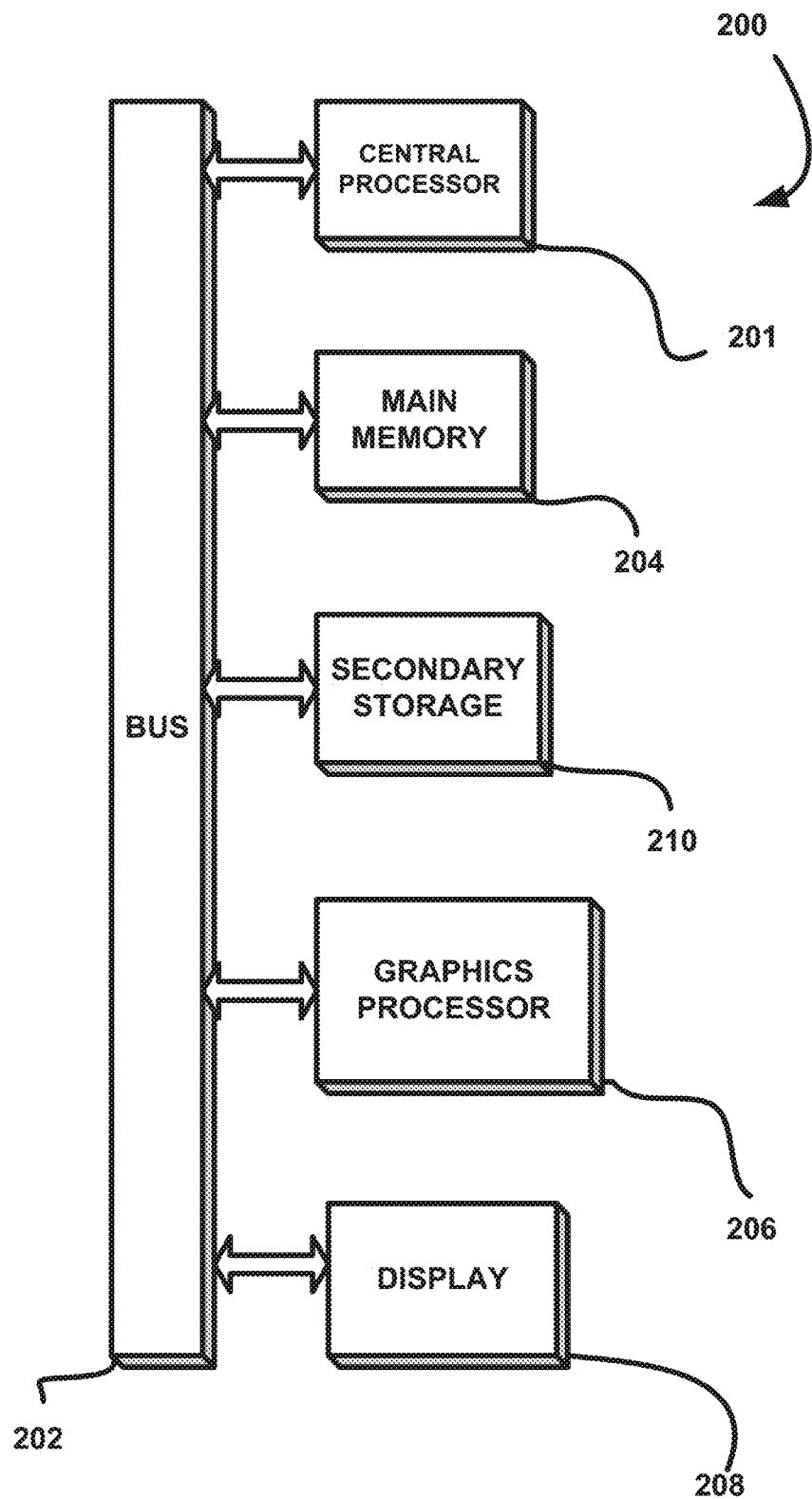
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
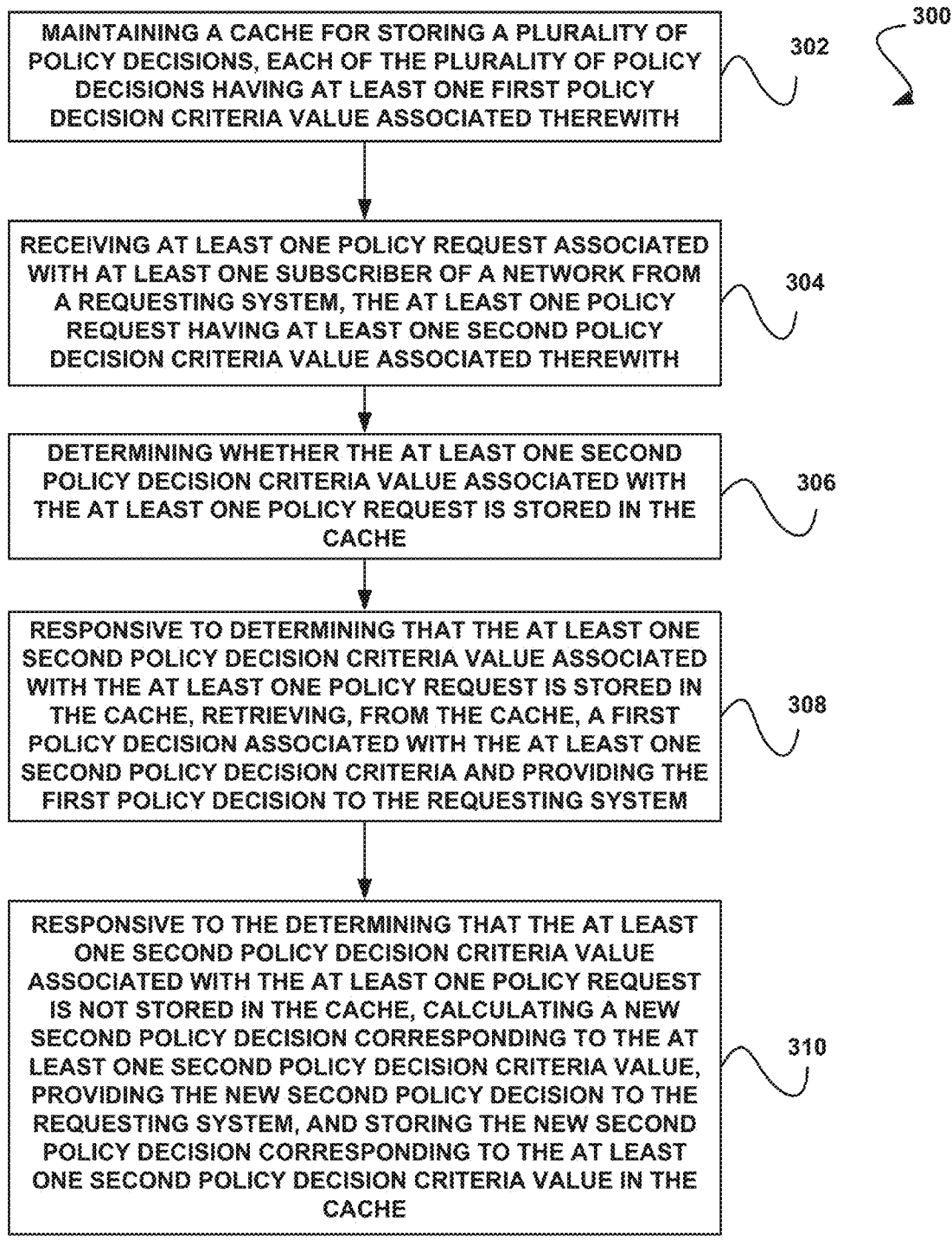
FIG. 3 illustrates a method for caching policy request decisions in a consumer telecommunications network, in accordance with one embodiment.

FIG. 3 illustrates a method 300 for caching policy request decisions in a consumer telecommunications network, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a cache for storing a plurality of policy decisions is maintained, where each of the plurality of policy decisions have at least one first policy decision criteria value associated therewith. See operation 302. In the context of the present description, a policy decision refers to any decision associated with a policy corresponding to a telecommunications network.

For example, in one embodiment, the policy decision may include a decision associated with a billing and/or a charging policy. In another embodiment, the policy decision may include a decision associated with a usage policy. In another embodiment, the policy decision may include a decision associated with an access policy (e.g. network access, etc.). In yet another embodiment, the policy decision may include a decision associated with a resource allocation policy (e.g. a quota allocation, etc.).

Additionally, in the context of the present description, a policy decision criteria value may include any value associated with criteria on which to base a policy decision. For example, in various embodiments, the policy decision criteria may include subscriber profile information, device class information (e.g. associated with a device of a particular subscriber, etc.), location information, access information, and/or various other criteria capable of being utilized to make a policy decision.

In these cases, the at least one first policy decision criteria value may include any value associated with the policy decision criteria. For example, in one embodiment, the at least one first policy decision criteria value may include a value associated with a subscriber profile classification. In another embodiment, the at least one first policy decision criteria value may include a value associated with a device class type.

In another embodiment, the at least one first policy decision criteria value may include a value associated with a user roaming or user non-roaming status, based on a serving GPRS support node (SGSN) IP address. In another embodiment, the at least one first policy decision criteria value may include a value associated with a radio access type including 4G LTE, 3G, and or various radio specifications.

The cache may include any type of policy decision and any type of criteria/value corresponding to the policy decision. In one embodiment, data in the cache (e.g. criteria, values, decisions, etc.) may be indexed utilizing the at least one first policy decision criteria value. As another option, data in the cache may be indexed utilizing at least one first policy decision criteria associated with the at least one first policy decision criteria value. For example, decisions and/or criteria may be hashed and indexed, for storing in the cache.

As shown further in FIG. 3, at least one policy request associated with at least one subscriber of a network is received from a requesting system, the at least one policy request having at least one second policy decision criteria value associated therewith. See operation 304. In one embodiment, receiving the at least one policy request associated with the at least one subscriber of the network from the requesting system may include automatically receiving the at least one policy request when the at least one subscriber of the network is in a process of connecting to the network (or when the subscriber has connected to the network, etc.).

In various embodiments, the requesting system may include a user device, a system associated with the network, and/or a third part system. In one embodiment, the request may include the at least one second policy decision criteria value(s) and/or the criteria associated therewith. The second policy decision criteria value(s) may include any type of criteria values associated with decision criteria.

As shown further, it is determined whether the at least one second policy decision criteria value associated with the at least one policy request is stored in the cache. See operation 306. In one embodiment, determining whether the at least one second policy decision criteria value associated with the at least one policy request is stored in the cache may include determining whether the at least one second policy decision criteria value matches the at least one first policy decision criteria value.

In another embodiment, determining whether the at least one second policy decision criteria value associated with the at least one policy request is stored in the cache may include determining whether at least one second policy decision criteria associated with the at least one second policy decision criteria value matches at least one first policy decision criteria value associated with the at least one first policy decision criteria value. Of course, any number of techniques may be used to determine whether the at least one second policy decision criteria value associated with the at least one policy request is stored in the cache (e.g. utilizing the indexing, etc.).

Responsive to determining that the at least one second policy decision criteria value associated with the at least one policy request is stored in the cache, a first policy decision associated with the at least one second policy decision criteria is retrieved from the cache, and the first policy decision is provided to the requesting system. See operation 308.

On the other hand, responsive to the determining that the at least one second policy decision criteria value associated with the at least one policy request is not stored in the cache, a new second policy decision corresponding to the at least one second policy decision criteria value is calculated, the new second policy decision is provided to the requesting system, and the new second policy decision corresponding to the at least one second policy decision criteria value is stored in the cache. See operation 310. In one embodiment, retrieving the first policy decision associated with the at least one second policy decision criteria and/or calculating the new second policy decision corresponding to the at least one second policy decision criteria value may occur without communication with a subscriber profile database.

The first policy decision and/or the new second policy decision may be based on a variety of criteria associated with the subscriber, etc. For example, in one embodiment, the first policy decision and/or the new second policy decision may be based, at least in part, on a subscriber profile associated with the at least one subscriber. In another embodiment, the first policy decision and/or the new second policy decision may be based, at least in part, on a device class associated with the at least one subscriber.

In another embodiment, the first policy decision and/or the new second policy decision may be based, at least in part, on a user location associated with the at least one subscriber. In yet another embodiment, the first policy decision and/or the new second policy decision is based, at least in part, on a radio access type associated with the at least one subscriber.

In one embodiment, the method 300 may include maintaining a reference count of a number of sessions that are currently using one of the plurality of policy decisions in the cache. The number of sessions may include the number of current instances of use associated with a particular policy decision. In one embodiment, it may be determined when the reference count of the number of sessions that are currently using the one of the plurality of policy decisions in the cache is zero. As an option, when it is determined the reference count of the number of sessions that are currently using the one of the plurality of policy decisions is zero, the one of the plurality of policy decisions may be automatically removed from the cache.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
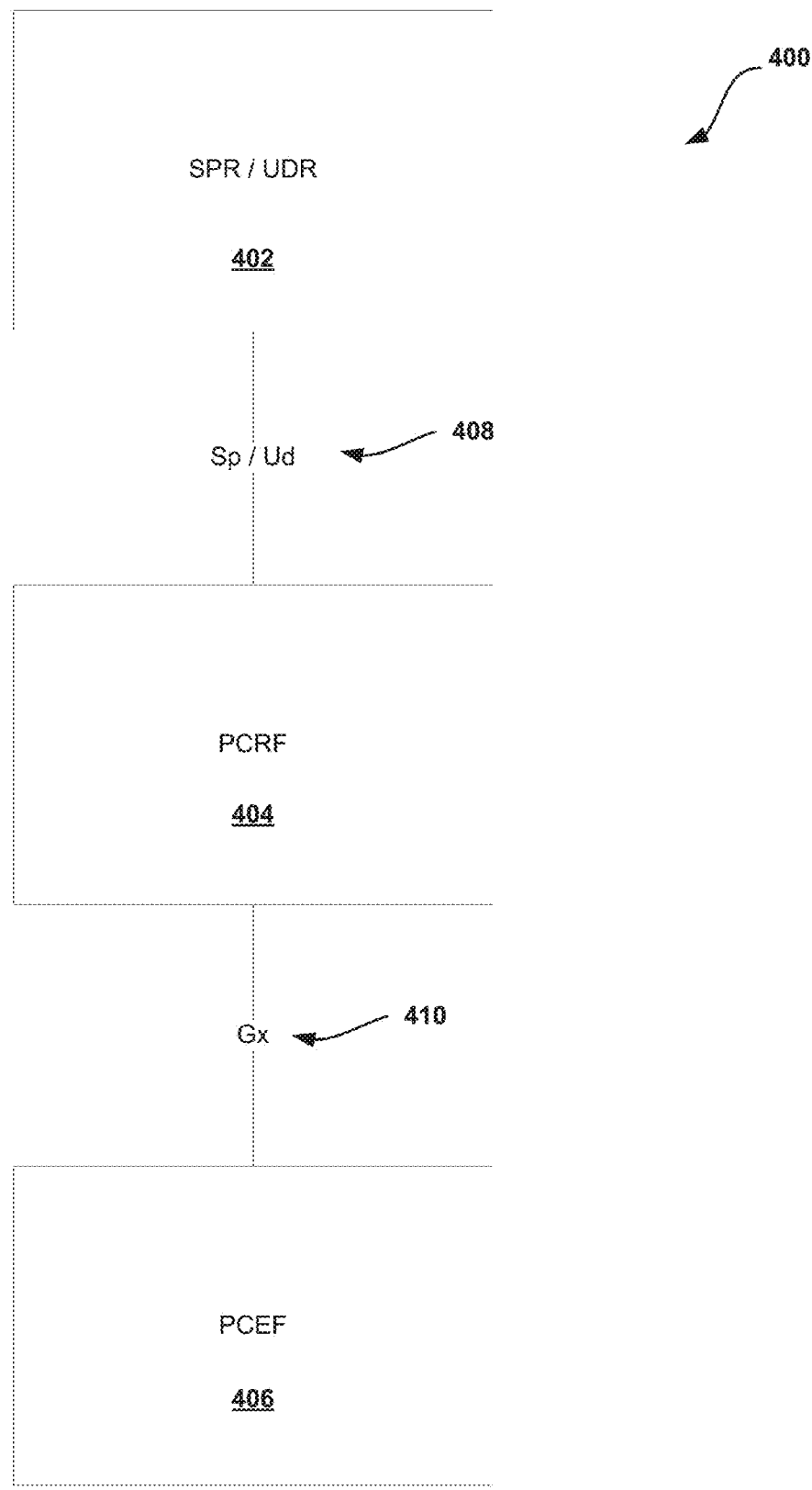
FIG. 4 illustrates a system for caching policy request decisions in a consumer telecommunications network, in accordance with one embodiment.

FIG. 4 illustrates a system 400 for caching policy request decisions in a consumer telecommunications network, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown, the system 400 includes an interface 410 between a Policy and Charging Enforcement Function (PCEF) system 406 and a Policy and Charging Rules Function (PCRF) 404 system. The system 400 further includes an interface 408 between the PCRF system 404 and a Subscriber Profile Repository (SPR)/User Data Repository (UDR) (e.g. in a 3GPP network architecture, etc.). In operation, the system 400 may function to cache policies and subscriber profile information in the policy server 404. In the context of the present description, a PCRF-based network refers to any network including one or more components designated to determine policy rules in a multimedia network.

In one embodiment, the system 400 may function to implement a consumer telecommunications network policy controller, which includes a policy decision cache (PDC) that allows policy decisions to be cached and re-used to improve server performance and reduce latency. In one embodiment, the policy criteria may be hashed and stored, such that if a user disconnects from the network and then reconnects to the network, and the same policy criteria are presented, the system may re-use the same policy decision. In one embodiment, the policy caching algorithm used in the policy controller may provide increased performance over existing commercial systems in terms of throughput, reduced latency, and reduced load on a subscriber profile repository (SPR).

Further, in one embodiment, the system may utilize a single cache entry for multiple subscribers. For example, instead of each subscriber having their decision cached, there may be a single cache entry for the set of policy criteria used to derive the resulting cache entry. In one embodiment, subscribers using the same set of criteria may be tied to this cache entry using a reference counting mechanism. As an option, when the reference count is reduced to zero for a certain period of time, the cache entry may be aged out.

In this way, the cache size may be reduced, allowing a single policy server to support an increased number of subscribers, allowing increased throughput, reduced latency, and reduced load on the subscriber profile repository 402. Although FIG. 4 is described in the context of a 3GPP architecture, such techniques may be applied in the context of another policy server architecture, such as specified by ETSI, or by CABLELABS®, etc.

In operation, when a policy server receives a policy request over the interface 410 (e.g. over Gx in 3GPP), the policy server 404 generally needs to obtain the subscriber profile information from the SPR/UDR 402 (e.g. via the interface 408, etc.) and then make a policy decision based on logic configured in the policy server. That policy decision may then be returned to the device which made the policy request.

In both mobile and fixed telecommunication networks, the criteria used for making policy decisions, and hence the policy decision itself, will typically not change frequently. For example, in a mobile network the policy may be based on a variety of criteria, including a subscriber profile, a device class, a user location based on SGSN IP address, and/or a radio access type. Therefore, when a subscriber detaches from the network and then re-attaches, the criteria for the policy will, in many cases, remain unchanged, and hence the policy will not have changed.

Thus, in one embodiment, the system 400 may employ a single cache entry for each policy decision, where the cache entry comprises criteria by which the policy decision was made. For example, in various embodiments, values of the criteria in the may include values such as: subscriber profile equals "gold"; device class equals "dongle"; user location equals "non-roaming"; and/or radio access type equals "4G LTE".

In one embodiment, the cache may be indexed by the criteria and/or the values of the criteria. When a subscriber having the same set of criteria and matching values comes online, the policy decision may be retrieved from the cache without having to re-evaluate the policy and without having to contact the subscriber profile database. This allows for increasing performance, reducing latency, and reducing the load on the subscriber profile database.

In one embodiment, the policy server may maintain a reference count of the number of sessions that are currently using the policy cache entry. In this case, when the count drops to zero for a configurable period of time the cache entry may be removed. Further, in one embodiment, the cache entry may be re-created if another session is established with the same criteria in the future.

Figure 5:
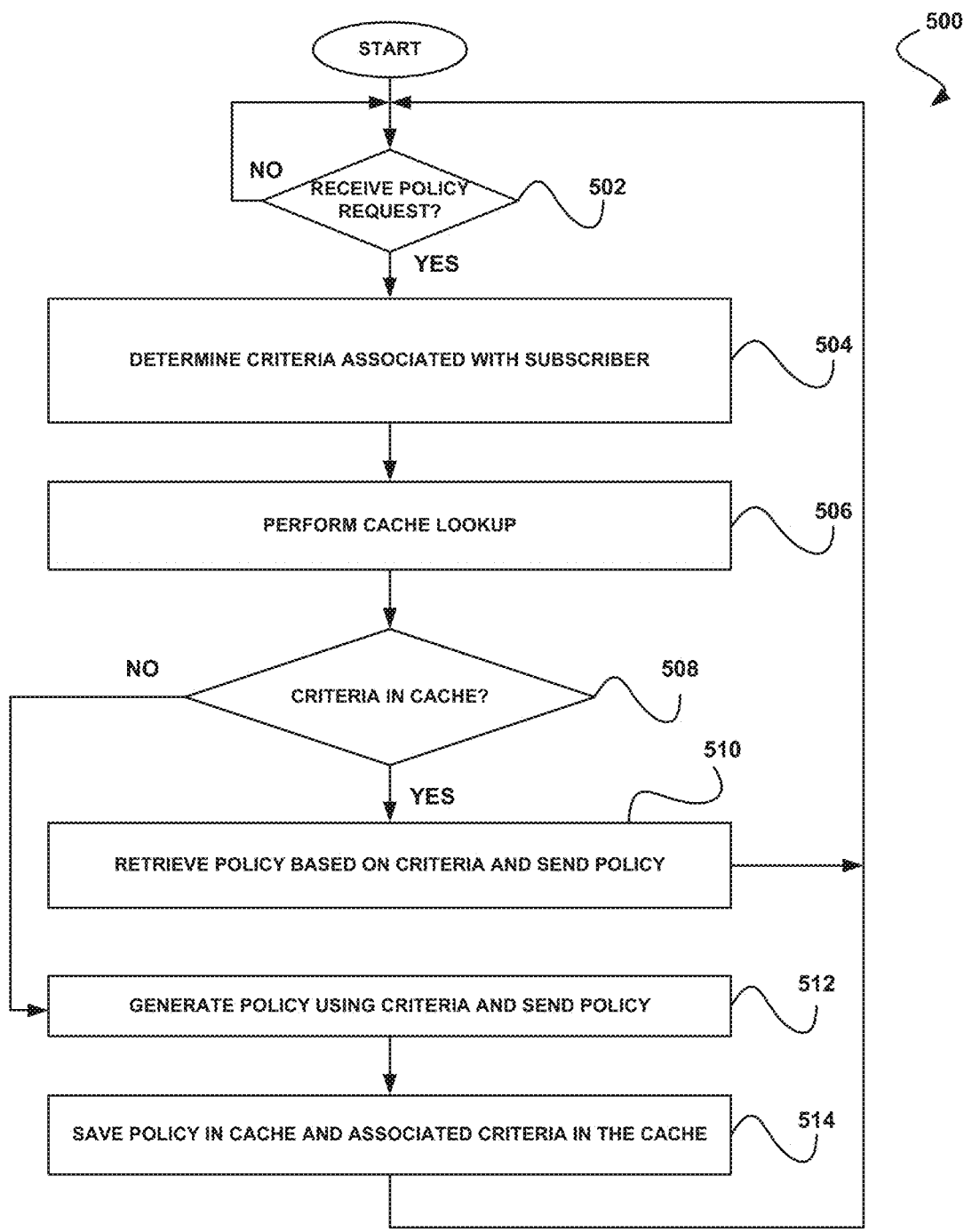
FIG. 5 illustrates a method for caching policy request decisions in a consumer telecommunications network, in accordance with another embodiment.

FIG. 5 illustrates a method 500 for caching policy request decisions in a consumer telecommunications network, in accordance with another embodiment. As an option, the method 500 may be implemented in the context of the details of FIGS. 1-4. Of course, however, the method 500 may be implemented in the context of any desired environment. Further, the aforementioned definitions may equally apply to the description below.

As shown, it is determined whether at least one policy request associated with at least one subscriber of a network is received from a requesting system, where the at least one policy request has policy decision criteria and/or values associated therewith. See determination 502. If a policy request is received, the criteria associated with a subscriber corresponding to the request is determined. See operation 504.

Further, a cache lookup is performed to determine whether the policy decision criteria and/or values associated with the at least one policy request are stored in the cache. See operation 506. Accordingly, it is determined whether the criteria and/or associated values are in the cache. See determination 508.

If there is a criteria/value match in the cache, a policy decision based on the criteria is retrieved and sent to the requesting system. See operation 510. If there is not a criteria/value match in the cache, a policy decision based on the criteria is generated and sent to the requesting system. See operation 512. Additionally, the policy decision and associated criteria/values are saved in the cache for future use. See operation 514.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing a computer program product, the computer program product comprising:
    computer code for storing a plurality of policies for a network including billing policies, usage policies, access policies, and resource allocation policies, each of the policies capable of being evaluated based on one or more associated predefined criteria to produce a policy decision, the associated predefined criteria including:
        subscriber profile information,
        subscriber device class,
        subscriber location indicating a roaming status, and
        subscriber radio access type;
    computer code for evaluating a subset of the policies utilizing input values for the associated predefined criteria;
    computer code for storing, in cache for each of the evaluated policies, a cache entry including:
        (a) a policy decision produced from the evaluating of the policy, and
        (b) an indication of the input values utilized to produce the policy decision;
    for each of the policy decisions stored in one of the cache entries in the cache, computer code for making the policy decision simultaneously accessible to each of a plurality of subscribers of the network that are identified by the input values utilized to produce the policy decision;
    computer code for receiving at least one policy decision request associated with at least one subscriber of the network from a requesting system, the at least one policy decision request including at least one input value;
    computer code for determining whether the at least one input value included in the request matches any of the input values stored in the cache;
    computer code for, responsive to determining that the at least one input value included in the request matches one or more of the input values stored in the cache:
        (c) retrieving, from the cache, the policy decision associated with each of the one or more of the input values stored in the cache that match the at least on input value included in the request, and
        (d) providing the retrieved policy decisions to the requesting system;
    computer code for, responsive to the determining that the at least one input value included in the request does not match any of the input values stored in the cache:
        (e) determining which of the stored policies are relevant to the request by determining which of the stored policies have associated predefined criteria that is relevant to the at least one input value included in the request,
        (f) evaluating the relevant policies utilizing the at least on input value included in the request to produce a policy decision for each of the relevant policies,
        (g) providing, to the requesting system, the policy decisions produced for the relevant policies, and
        (h) storing, in the cache for each of the relevant policies:
            (1) the policy decision produced from evaluating the relevant policy, and
            (2) an indication of which of the at least one input value included in the request was utilized to produce the policy decision;
    computer code for maintaining, for each of the policy decisions in the cache, a reference count of a number of the subscribers with current sessions in the network that are identified by the input values utilized to produce the policy decision and accordingly are currently using the policy decision in the cache;
    computer code for automatically removing each of the plurality of policy decisions from the cache when the reference count maintained for the policy decision is zero for a predefined period of time.

2. The non-transitory computer readable medium of claim 1, wherein the computer program product is operable such that the cache entries in the cache is indexed utilizing the input values.

3. The non-transitory computer readable medium of claim 1, wherein the computer program product is operable such that the cache entries in the cache further includes the predefined criteria based upon which the policies are evaluated and is indexed utilizing the predefined criteria associated with the input values.

4. The non-transitory computer readable medium of claim 1, wherein the computer program product is operable such that receiving the at least one policy decision request associated with the at least one subscriber of the network from the requesting system includes automatically receiving the at least one policy decision request when the at least one subscriber of the network is in a process of connecting to the network.

5. A method, comprising:
    storing a plurality of policies for a network including billing policies, usage policies, access policies, and resource allocation policies, each of the policies capable of being evaluated based on one or more associated predefined criteria to produce a policy decision, the associated predefined criteria including:
        subscriber profile information,
        subscriber device class,
        subscriber location indicating a roaming status, and
        subscriber radio access type;
    evaluating a subset of the policies utilizing input values for the associated predefined criteria;
    storing, in cache for each of the evaluated policies, a cache entry including:
        (a) a policy decision produced from the evaluating of the policy, and (b) an indication of the input values utilized to produce the policy decision;

for each of the policy decisions stored in one of the cache entries in the cache, making the policy decision simultaneously accessible to each of a plurality of subscribers of the network that are identified by the input values utilized to produce the policy decision;

receiving at least one policy decision request associated with at least one subscriber of the network from a requesting system, the at least one policy decision request including at least one input value;

determining whether the at least one input value included in the request matches any of the input values stored in the cache;

responsive to determining that the at least one input value included in the request matches one or more of the input values stored in the cache:
(c) retrieving, from the cache, the policy decision associated with each of the one or more of the input values stored in the cache that match the at least on input value included in the request, and
(d) providing the retrieved policy decisions to the requesting system; and responsive to the determining that the at least one input value included in the request does not match any of the input values stored in the cache:
(e) determining which of the stored policies are relevant to the request by determining which of the stored policies have associated predefined criteria that is relevant to the at least one input value included in the request,
(f) evaluating the relevant policies utilizing the at least on input value included in the request to produce a policy decision for each of the relevant policies,
(g) providing, to the requesting system, the policy decisions produced for the relevant policies, and
(h) storing, in the cache for each of the relevant policies:
(1) the policy decision produced from evaluating the relevant policy, and
(2) an indication of which of the at least one input value included in the request was utilized to produce the policy decision;

maintaining, for each of the policy decisions in the cache, a reference count of a number of the subscribers with current sessions in the network that are identified by the input values utilized to produce the policy decision and accordingly are currently using the policy decision in the cache; and automatically removing each of the plurality of policy decisions from the cache when the reference count maintained for the policy decision is zero for a predefined period of time.

6. A system comprising:

a memory system; and one or more processing cores coupled to the memory system and that are each configured to:

store a plurality of policies for a network including billing policies, usage policies, access policies, and resource allocation policies, each of the policies capable of being evaluated based on one or more associated predefined criteria to produce a policy decision, the associated predefined criteria including:
subscriber profile information,
subscriber device class,
subscriber location indicating a roaming status, and
subscriber radio access type;

evaluate a subset of the policies utilizing input values for the associated predefined criteria;

store, in cache for each of the evaluated policies, a cache entry including:
(a) a policy decision produced from the evaluating of the policy, and
(b) an indication of the input values utilized to produce the policy decision;

for each of the policy decisions stored in one of the cache entries in the cache, make the policy decision simultaneously accessible to each of a plurality of subscribers of the network that are identified by the input values utilized to produce the policy decision;

receive at least one policy decision request associated with at least one subscriber of the network from a requesting system, the at least one policy decision request including at least one input value;

determine whether the at least one input value included in the request matches any of the input values stored in the cache;

responsive to determining that the at least one input value included in the request matches one or more of the input values stored in the cache:
(c) retrieve, from the cache, the policy decision associated with each of the one or more of the input values stored in the cache that match the at least on input value included in the request, and
(d) provide the retrieved policy decisions to the requesting system; and responsive to the determining that the at least one input value included in the request does not match any of the input values stored in the cache:
(e) determine which of the stored policies are relevant to the request by determining which of the stored policies have associated predefined criteria that is relevant to the at least one input value included in the request,
(f) evaluate the relevant policies utilizing the at least on input value included in the request to produce a policy decision for each of the relevant policies,
(g) provide, to the requesting system, the policy decisions produced for the relevant policies, and
(h) store, in the cache for each of the relevant policies:
(1) the policy decision produced from evaluating the relevant policy, and
(2) an indication of which of the at least one input value included in the request was utilized to produce the policy decision;

maintain, for each of the policy decisions in the cache, a reference count of a number of the subscribers with current sessions in the network that are identified by the input values utilized to produce the policy decision and accordingly are currently using the policy decision in the cache; and automatically remove each of the plurality of policy decisions from the cache when the reference count maintained for the policy decision is zero for a predefined period of time.

* * * * *